(12) United States Patent
Bares et al.

(10) Patent No.: US 6,832,659 B1
(45) Date of Patent: Dec. 21, 2004

(54) LOADER FRAME AND BOLT-ON TRACK DRIVE

(75) Inventors: Mark F. Bares, Oakes, ND (US); James H. Page, Bottineau, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 20 days.

(21) Appl. No.: 10/284,432

(22) Filed: Oct. 30, 2002

Related U.S. Application Data (60) Provisional application No. 60/335,351, filed on Nov. 1, 2001.

(51) Int. Cl.[7] .............................................. B62D 55/301
(52) U.S. Cl. ..................... 180/9.22; 180/9.56; 180/19.1; 305/130; 305/135
(58) Field of Search ........................ 180/9.1, 9.21–9.23, 180/9.26, 9.48, 9.56, 209, 19.1–19.3; 305/130, 135, 125, 116

(56) References Cited

U.S. PATENT DOCUMENTS

| | | | |
|---|---|---|---|
| 1,317,103 A | 9/1919 | Rimailho | |
| 3,688,858 A | 9/1972 | Jespersen | 180/9.62 |
| 4,955,455 A | 9/1990 | Albright et al. | 180/291 |
| 5,988,775 A | 11/1999 | Nordberg | 305/143 |
| 6,247,547 B1 | 6/2001 | Lemke et al. | 180/9.5 |
| 6,318,484 B2 * | 11/2001 | Lykken et al. | 180/9.48 |
| 6,460,640 B1 * | 10/2002 | Keagle et al. | 180/19.3 |
| 2003/0079931 A1 * | 5/2003 | Bares et al. | 180/305 |

* cited by examiner

Primary Examiner—Lesley D. Morris
Assistant Examiner—Matthew Luby
(74) Attorney, Agent, or Firm—Westman, Champlin & Kelly, P.A.

(57) ABSTRACT

A small loader has a central body that is formed as a unitary frame that has spaced apart side walls. The body is supported on drive and support units that are independently assembled, and have mounting plates that bolt to the exterior of the respective side walls of the body when the loader is to be assembled. The mounting plates support a framework for mounting spaced rotatable members, as shown members that mount a drive track for propelling and supporting the body. In one form a separate track drive sprocket is positioned above a slidably mounted track idler that creates a tension in the drive track.

3 Claims, 7 Drawing Sheets

LOADER FRAME AND BOLT-ON TRACK DRIVE

This application refers to and claims priority from Provisional Application Ser. No. 60/335,351 filed Nov. 1, 2001, the content of which is incorporated by reference.

BACKGROUND OF THE INVENTION

The present invention relates to a small loader that has a unitized central body forming a frame, and which has drive units on the body for propelling the loader. The drive units are, as shown, right and left-hand track assemblies that have mounting plates on which drive components can be assembled apart from the loader body and then bolted into place. Preassembly of the drive units permits efficient assembly.

Prior skid steer loaders have used a unitized central body or frame that mounts drive hydraulic motors, and then has chain drives going to front and rear wheels. The axles and wheel hubs are individually mounted onto the central body during assembly of the loader. Thus, while a unitized body is provided, the drives are not assembled as a unit and then mounted to the body.

Additionally, various track drive units for loaders have used sub-frames for mounting the bogie wheels, but the drive unit is not preassembled on a mounting plate. A skid steer loader that has a center body is shown in U.S. Pat. No. 4,955,455, but the drive units are all part of the frame as it is built-up, and the wheels are added at the very end of assembly.

SUMMARY OF THE INVENTION

The present invention relates to a small loader, for example a walk behind loader that is, in the form shown, track propelled by drive units on opposite sides of a center body or frame. The drive and propelling units are at least partially preassembled so the major drive components and supports are on a mounting plate. The plate is then bolted onto the sides of the body or frame. The drive motor, drive sprocket and the track can be assembled last, after the plate is attached to the body, or can be preassembled, since the motor bolts to the mounting plate and do not fasten on the side wall of the body. The drive unit can be preassembled as a unit including at least the major components, and merely bolted in place.

For track-drive units, as shown, this arrangement is particularly advantageous in that the frame for the bogie wheels, and the frame slidably holding the spring loaded front idler wheel or sprocket (or the rear idler in the second form of the invention) can be welded to the mounting plate. The parts are preassembled on the frame and mounting plate, and then the plate is bolted on as a unit to the loader body. When desired, and if the weight of the assembly is not excessive, the drive motor can be bolted to the mounting plate, the drive sprocket placed on the motor shaft and the track put over the drive sprocket and idler wheel, so all components of each drive unit are preassembled on the mounting plate.

A modified form of the invention utilizes a drive motor and sprocket that are raised above a pair of idler wheels that support the bottom portion of the track, and the arrangement can be to use a rear tightener wheel, with a stationary forward wheel. However, the guide wheels or end sprockets for the track can be mounted on a mounting plate as in the first form of the invention, with slight modifications in the construction of the frame and supports for the pivoting loader arm.

If drive wheels and rubber tires are used, the same concept can be utilized. The components that are necessary for driving the wheels and tires can be mounted onto a plate, and then the plate in turn bolted directly to the frame. For skid steer loaders, drive chains from one motor can be used for driving both the front and rear wheels and tires and would be on the outside of the mounting plate. The wheels and tires can be mounted on sub axles cantilevered from the mounting plate. Coupling a hydraulic drive motor to the drive sprocket through provided openings in the frame and the mounting plate can easily be achieved.

DETAILED DESCRIPTION OF THE ILLUSTRATIVE EMBODIMENTS

Figure 1:
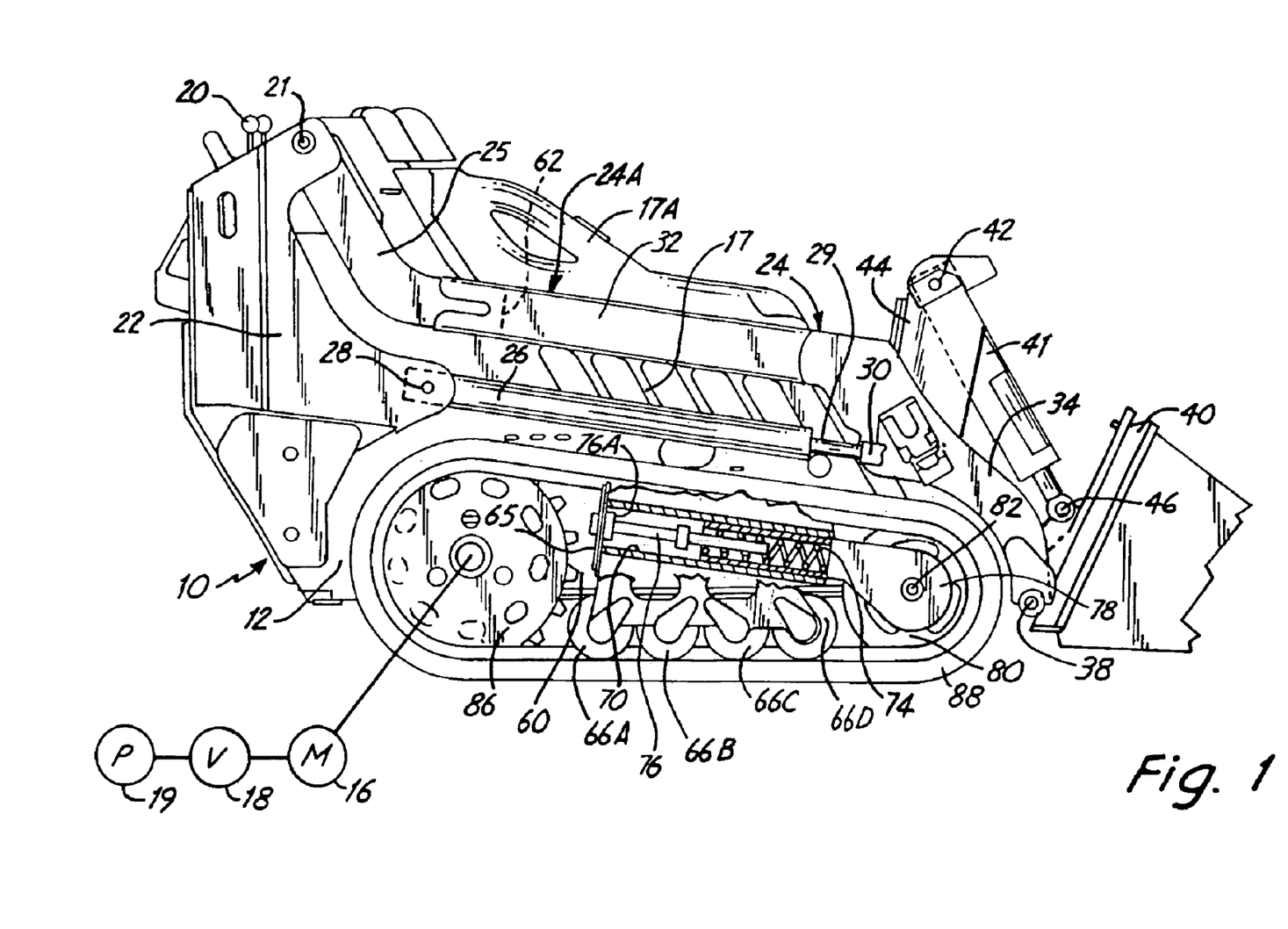
FIG. 1 is a side elevational view of a compact loader having drive units made according to the present invention.
Figure 2:
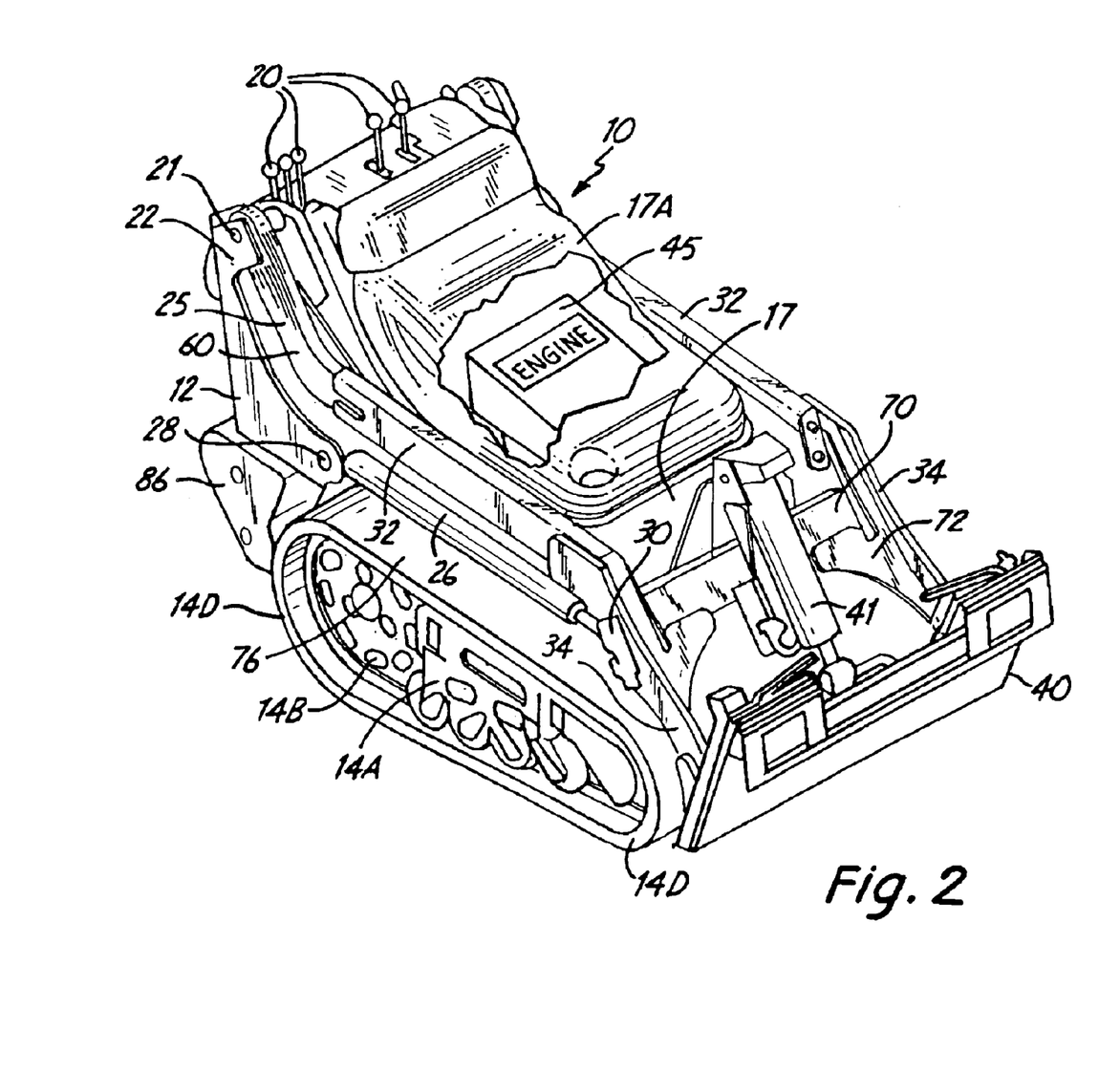
FIG. 2 is a perspective view of the loader of FIG. 1.

Referring to FIG. 1, a small loader indicated generally at 10 is a walk behind powered loader that has a body or frame 12. The body or frame 12 supports a ground drive and support member or assembly 14 on each side of the loader for propelling the loader in forward and reverse directions through the use of drive hydraulic motors indicated schematically at 16 in FIG. 1 and also in FIG. 3. The drive motors 16 are connected to a pump 19 through a valve 18 shown schematically, and controlled by one of a plurality of valve control handles 20 positioned at the upper end of a control panel for the skid steer loader. The pump 19 is driven by an internal combustion engine 45 mounted on the body in a housing 17 that has a cover 17A.

The body 12 has upright supports 22 at the rear portions of the body, and these supports extend upwardly a little higher than waist level of an operator standing on the ground. The upright supports in turn pivotally support ends of a lift arm assembly 24 on pivots 21 at the upper ends of the supports. As shown the pivots 21 are at or near the uppermost part of the loader.

The lift arm assembly includes individual lift arms 24A and 24B, on opposite sides of the body, and each lift arm has a base end or rear portion 25 that inclines downwardly from the pivot 21 at an angle essentially parallel to the rear portions of the frame and engine cover. The base portion 25 of each lift arm joins a side lift arm portion 32 that extends parallel to the upper length of the respective track of the track assembly on the respective side of the loader. The side lift arm portions 32 join forward lift arm portions 34 that are recessed in a curve that fit around the front ends 37 of the tracks, respectively.

The lift arm assembly 24 is raised and lowered with extendible and retractable double acting hydraulic cylinders or actuators 26 operating under hydraulic pressure from the pump 19 and controlled by a valve forming part of the controls 20.

The cylinders 26 (there is one on each side, and only one is shown) have base ends pivotally mounted as at 28 to portions of the body, and the cylinders have rods 29 that have rod ends that are pivotally mounted as at 30 to each of the lift arms of the lift arm assembly 24.

Pivot pins 38 at the forward ends of the lift arms in turn are used for mounting a quick attachment plate of 41 of conventional design normally used with the BOBCAT® skid steer loaders made by the Bobcat Company Business Unit of Ingersoll-Rand Company. The attachment plates 41 are well known, and the pins 38 permit the attachment plate and a bucket mounted on the plate to be pivoted about a horizontal axis by a bucket control cylinder 40. The cylinder 41 has a base end connected as at 42 to an upright strut 44 mounted on a cross member 70 that holds the lift arms 24A and 24B together to form the lift arm assembly. The rod end of the actuator or cylinder 41 is connected as at 46 to a bracket on the attachment plate 40. A bucket 48 is shown in position on the attachment plate 41, and this too is supported on the attachment plate 41 in a known manner.

The drive unit assembly 14 on each side of the machine can be completely or partially preassembled on a mounting plate and bolted or otherwise fastened into place on one side wall 90A or 90B of the body or frame 12. It is to be understood that other types of ground drive units can also be attached to mounting plates, and bolted to the body or frame, within the concept of this invention. The exemplary form disclosed the track drive shown.

Figure 3:
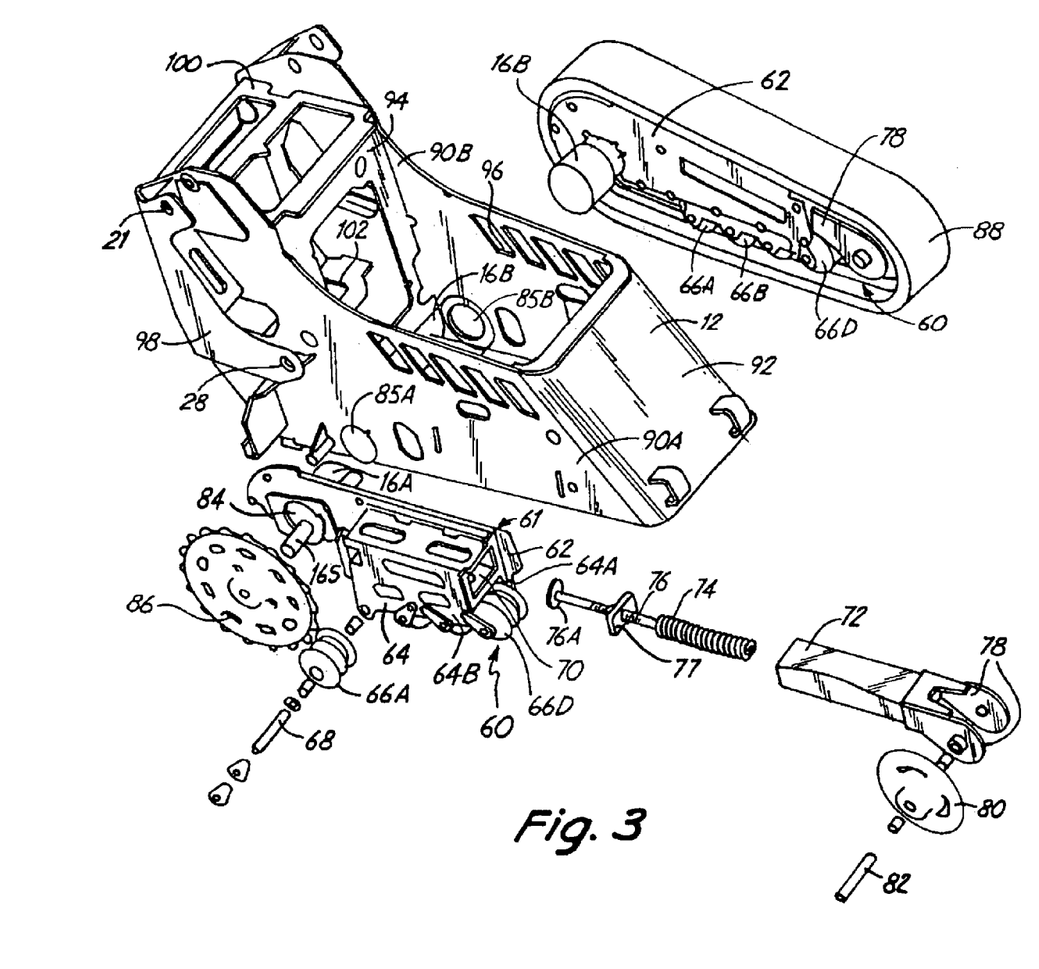
FIG. 3 is an exploded perspective view of the loader body frame and ground drive units shown in an exploded view.
Figure 4:
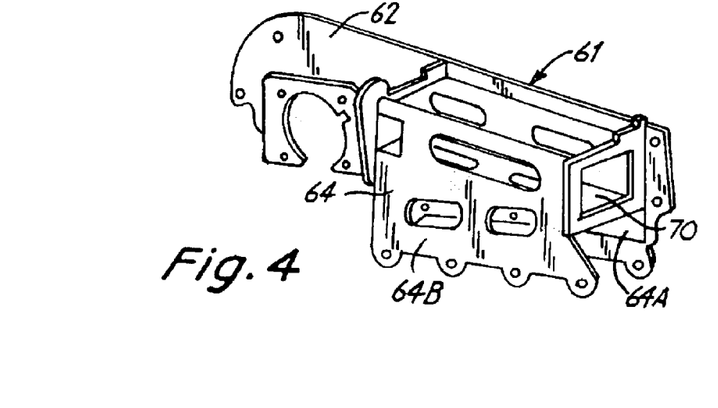
FIG. 4 is a perspective view of a mounting plate and bogie wheel frame used in the present invention.
Figure 5:
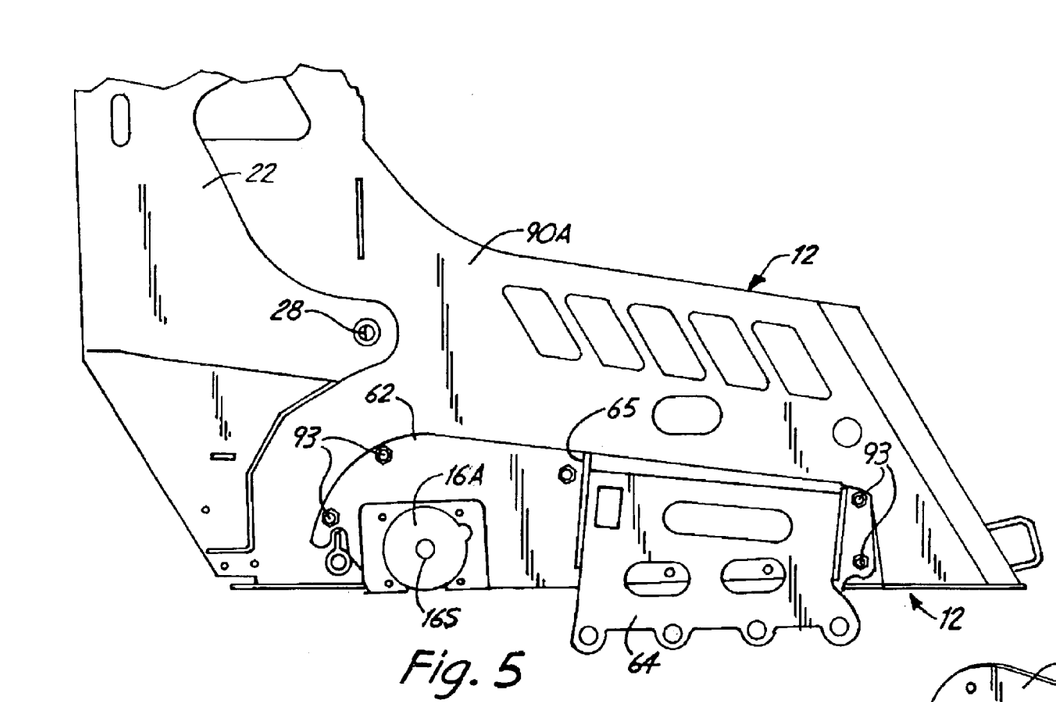
FIG. 5 is a side elevational view of the frame of FIG. 4 to illustrate connections to the loader body.

The track drive includes an undercarriage assembly or drive unit 60 shown in FIGS. 3, 4 and 5. There are right and left undercarriage assemblies, which are mirror images of each other. Each of the undercarriage assemblies includes a mounting plate 62, and a slide frame or housing 64 that also serves as a mounting for bogie wheels 66A, 66B, 66C and 66D fixed to the mounting plate. The bogie wheels are mounted on suitable spindles or axles, as shown in FIG. 3 at 68, typically. The bogie wheels are mounted on the housing 64 between an inner side plate 64A and an outer side plate 64B of the slide frame or housing on each side of the body or frame 12.

The slide housing 64 is welded to the mounting plate 62 so it is securely held on the mounting plate. The housing 64 includes a slide support wall 70 that forms a guide for an idler wheel slide 72. The idler wheel slide 72 is spring loaded a forward direction in a normal manner, utilizing a spring 74, mounted over a support shaft 76 that mounts in the housing 64. The spring 74 exerts a spring force on the slide 72 in a forward direction. The slide 72 includes forwardly extending flanges 78 between which a track idler wheel 80 is rotatably mounted on a suitable spindle or axle.

The rear portion of the mounting plate 62 has an opening 84 that accommodates a bolt-on hydraulic motor 16A on that side of the machine, with a shaft 16S that protrudes out through the opening 84, and on which a track drive sprocket 86 is drivably mounted. The motor can be installed after the plate 62 is in place on the body 12, if the drive sprocket and the track are not to be added to or made part of the preassembled drive unit on mounting plate 62.

In FIG. 5, the end of the motor 16A is illustrated, with the shaft 16S also shown, the motor 11A fits through an aligning opening 85 in the side wall 90A of the body. If the motor 16A and drive sprocket 86 are preassembled on the mounting plate, all of the hydraulic fittings are left off the motor until the motor is slid into place through the opening 85 in the side wall 90A of the body.

A drive track 88 is mounted over the drive sprocket 86 and the idler wheel or sprocket 80. The drive track is supported along a bottom length by the bogie wheels 66A–66D. Again the track can be left off until the plate 62 has been mounted on the body 12.

The body or frame 12, as shown, is a unitized welded body that includes side walls 90A and 90B extending in fore and aft direction. The side walls 90A and 90B have the upright portions 22 thereon. Additionally, the side walls 90A and 90B are held together with a front, rearward sloping wall 92, and a rear partition 94. The partition 94 and front wall 92, as well as the side walls 90A and 90B divide out an engine compartment or chamber 96, in which an engine is mounted for driving the hydraulic pump 19 and other components needed. The hydraulic motors shown at 16A and 16B thus also extend into chamber 96. The motors mount on to the mounting plate 62 and the motor shafts 16S extend outwardly for supporting the track drive sprockets on the opposite sides of the body 12.

In assembly, the body can be welded up, as shown, and suitable guide plates 98 are welded in place to support the pivots 21 for the liftarms. A top plate support 100 can be provided between the side plates 90A and 90B for supporting the controls 20. The body thus provides for a rigid support. The body also can include a lower horizontal plate member 102 for further structural strength and for mounting components. The side plates 90A and 90B also support the pivots 28 for the lift cylinders 26.

The body 12 is fully welded together with the components including the side walls and front walls as well as the rear dividers. The drive units 60 always are preassembled with mounting plate 62, slide frame 64, the bogie wheels and the idler wheel in place. The spring control shaft 76 is rotatably mounted on an end wall 65 of the housing and is provided with a trust washer 76A to react spring loads back to the end wall 65. The shaft is threaded through a spring force reaction bar 77, that holds the spring so the spring loads against an end wall of the slide. For initial assembly, the screw 76 is threaded so that the spring 74 acting on the slider 72 is unloaded. The idler wheel is assembled to the slider.

The drive units 60 can be wheels and tires merely by replacing wheels 80 and 86 with wheels and tires that support the frame. The rear wheel can be mounted on the drive motor, and the front wheel mounted on the frame in a desired manner and driven with a chain and sprocket. The tires also could support a track that extended over both tires on each side, as now is done on skid steer loaders. The wheels form part of ground drive and support members.

Figure 6:
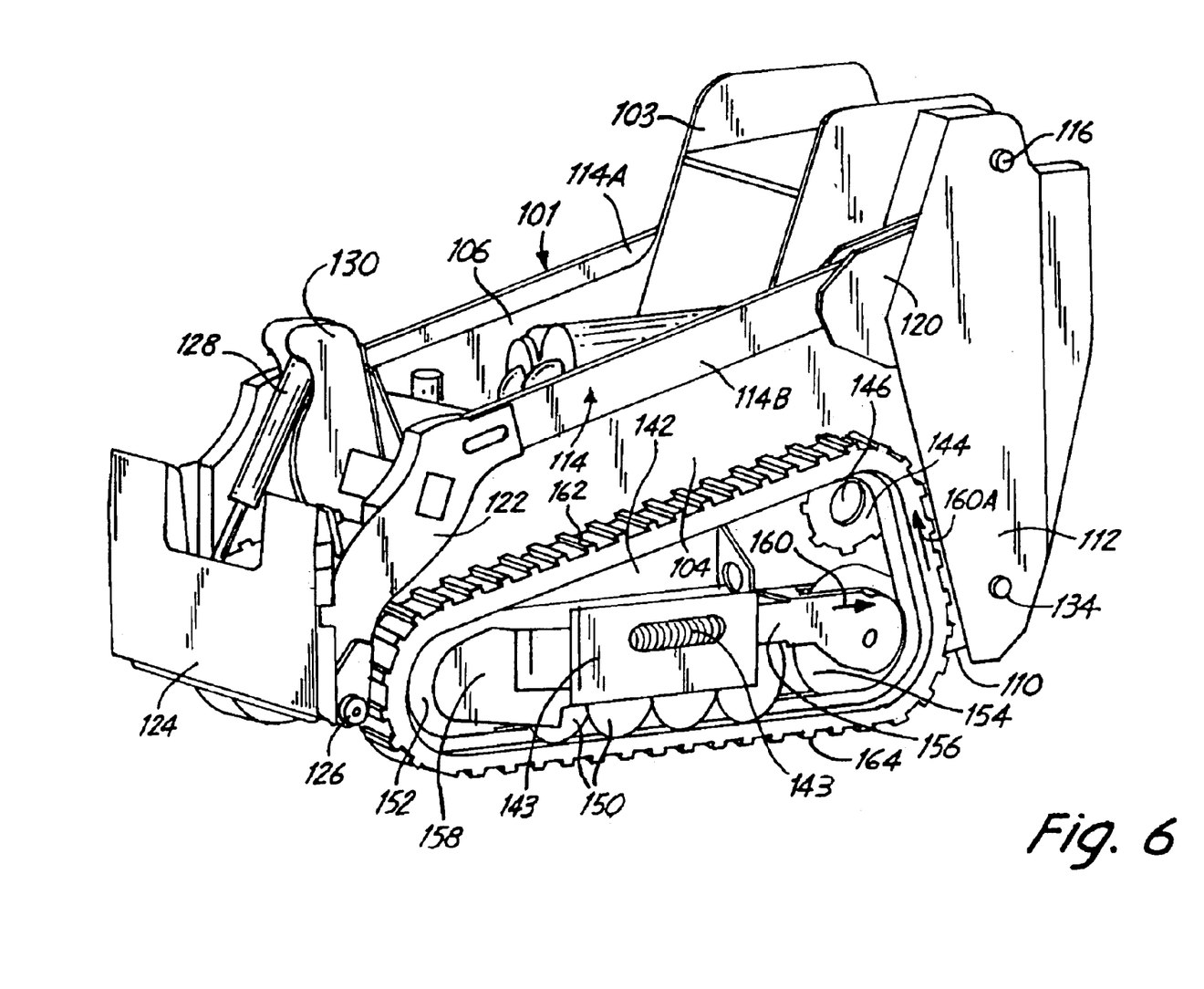
FIG. 6 is a side perspective view of a modified form of the invention schematically showing an alternate form of track drive and modified loader arms, as a modified form of the invention.
Figure 7:
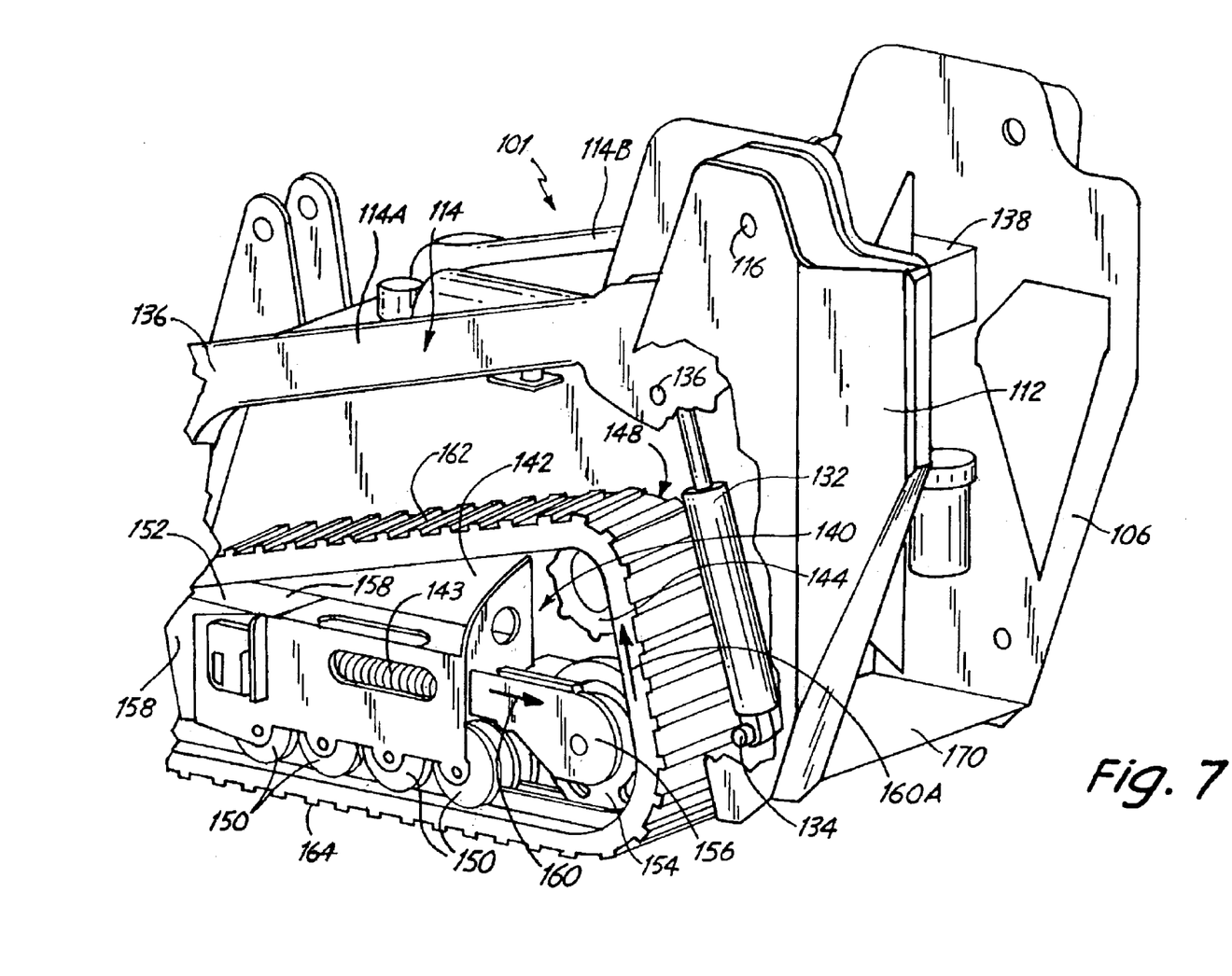
FIG. 7 is a rear perspective view of the loader shown in FIG. 6.
Figure 8:
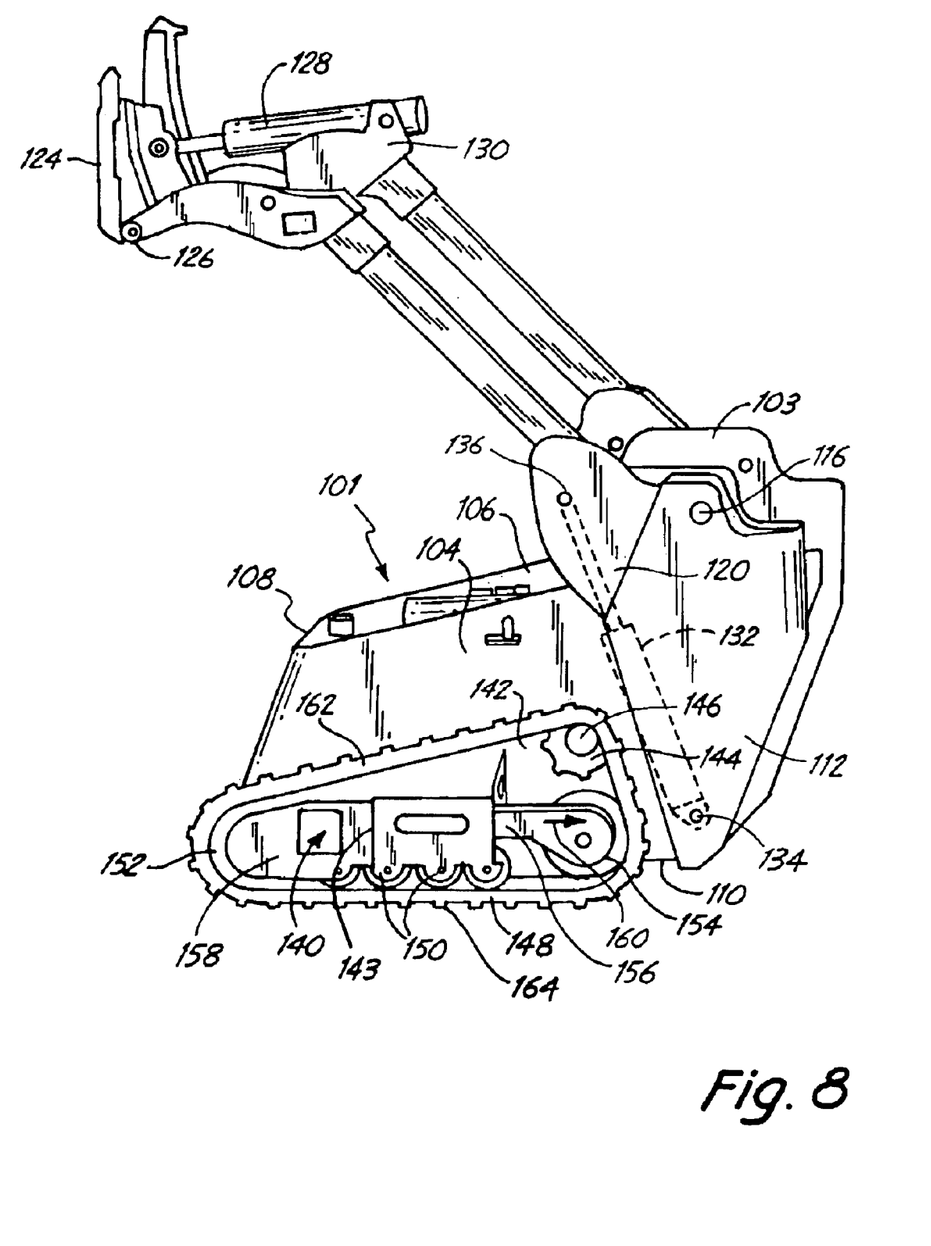
FIG. 8 is a perspective side view showing lift arms of the second form of the invention in a raised position.

Referring to FIGS. 6, 7, and 8 in a modified form of the invention, a loader 101 is shown, and is schematically illustrated. The loader has a frame 108 that is made with upright side plates 104 and 106, on opposite sides of the loader as can be seen in FIG. 8, and these plates 104 and 106 are joined with a front cross plate 108. The plates 104, 106 and 108 can extend all the way to the bottom of the loader frame, the lower edge line of which is shown at 110, in FIG. 8.

The rear portions of the side support plates 104 and 106 have outer side plates 112, mounted thereon, on both sides of the frame, and these plates 112 are spaced from the side plates 104 and 106, so that the lift arm assembly indicated at 114 and made up on individual lift arms 114A and 114B can be supported on pivot pins 116 between the plates 112 and the respective frame plates 104 and 106. The arms 114A and 114B each are formed with a rear gusset assembly or plate 120 that is pivotally mounted at pivot 116, and they have forward supports 122 on which a quick attachment plate 124 is mounted as previously explained. The quick attachment plate 124 is pivotally mounted on pivots 126, and can be controlled with a tilt cylinder shown schematically at 128 in FIG. 6, that is supported on a tilt cylinder upright support 130.

The lift arm assembly 114 is raised and lowered through the use of hydraulic cylinders, as in the first form of the invention, shown only schematically at 132 in FIG. 7. The lift cylinders are mounted back to the side plates 112 and frame plates 104 and 106, on suitable pins 134, and have rod ends attached as 136 to the gusset portions of the lift arms 114A and 114B so that the lift arms can be raised and lowered, as shown in FIGS. 6 and 7, in the lowered position in the FIG. 8 in the raised position.

In this form of the invention, the controls are at the rear of the machine as previously shown. In order to power the unit and propel it over the ground, bolt on frame assemblies indicated generally at 140 are provided on opposite sides of the frame. These frame assemblies include frame plates 142, bolted onto the frame plates 104 and 106. An undercarriage frame or housing 143 is supported on bolt on plates 142. In this form of the invention, each drive unit on the bolt on plate has a drive sprocket 144 that is driven by a motor 146 shaft and mounted to bolt on plate 142. The motor 146 on each side of the frame is positioned at the rear portion of the plate to drive the drive track 148 from the rear. The drive track 148 is supported on the ground with bogie wheels 150 on the bolt on plate that hold the lower reach 164 of the track flat for ground contact. A front idler guide wheel or support wheel 152 that is rotatably mounted on spaced plates 158 of the frame 143, which, again, is carried on bolt on plate 142. The idler guide wheel 152 does not move longitudinally. The tension in the track 148 is adjusted with a rear track idler guide wheel 154 that is mounted on a sliding frame 156. Sliding frame 156 is slidably mounted in housing 143 that supports the bogie wheels, the housing 143 has an internal spring 145 mounted as previously shown, for providing rearward force to tension the track 148 in a rearward direction as indicated by the arrow 160.

The mounting of the drive sprocket above the tensioner idler wheel with a horizontal sliding tensioner lessens the spring force because a force in direction of arrow 160A along the track length between the idler wheel 154 and sprocket 144 is not parallel with the force of the spring.

The components on the frame plate 140 for each side of the loader can be preassembled as previously explained, and then bolted onto the frame plates 104 and 106 respectively, for operation. The track 148 has an inclined upper reach or portion 162, and the flat ground support portion 164 that provides the support for movement over the ground.

The modified form of the invention can also be used as a walk behind unit, or can have a support platform 170 for supporting an operator, if that is desired. The lift arms 114A and 114B are modified, as can be seen. The cylinder 132 can be operated to raise and lower the lift arm assembly, which can have attachments mounted at the outer end of the lift arms on the attachment plate 124.

The bogie wheels 66 or 150 are placed on the respective support frame or housing 64 and 143, which is on the respective mounting plate 62 or 142. The mounting plates support frames and the track tension slides, idler wheels and adjustment springs can then be mounted on the side walls 90A or 104, 106 as shown in FIG. 5 with bolts, rivets or other fasteners 93 (see FIG. 5). The rest of the assembly can then take place on the body, by attaching the motor 16A to the plate 62 or plate 142 from inside the body. The motor shaft 16A or 146 would extend out so the drive sprocket 86 or 144 could be placed on the respective shaft. The track 88 or 148 then would be put into place around its supports. As shown in FIG. 1, shaft 76 is rotated to move reaction bar 77 against spring 76 to load the slide and idler wheel 80 (or 152) and apply tension in the track.

Alternatively, the hydraulic motor 16A for that side drive unit can be bolted to the respective mounting plate, and the drive sprocket mounted on the shaft. The track can be placed over the sprocket 86 and idler wheel 80, and underneath bogie wheels 66A–66D shown in the first form of the invention, or drive sprocket 144, wheels 150, 152 and 154 in the second form of the invention, so there is a full drive assembly made apart from the loader body. The drive unit sub-assembly, such as that shown at 60 in FIG. 3, then can be bolted to the side wall 90A (or 104, 106) with suitable bolts or capscrews 93 in openings in the two parts that mate. The motors 16A and 16B will slip through openings such as 85A and 85B. The plates 62 or 142 are positioned so that the bogie wheels 66A–66D or 150 are on a plane to support the track at a level below the lower panel of the loader body so that the body is supported off the supporting surface a desired amount.

Thus, a complete bolt-in drive unit can be made separately from the loader frame and then bolted to the frame as a unit.

The mounting plate and slide frame with the slide frame components also can be mounted as a unit, and the motor, track drive sprocket and track assembled afterwards.

In the case of the use of drive wheels as distinguished from tracks, mounting plate 62 of the first form of the invention is used for mounting cantilevered axles for the wheels spaced in fore and aft direction, and then a single drive motor would be mounted in the center of the plate or at front axle, rear axle high drive locations, with drive chains or belts going to wheel hubs mounted on the axles in both front and rear directions. Then the plate 62 could be bolted directly to the body side plates in the same manner, with a self-contained single side drive and support made as a sub-assembly and bolted to the respective side of the loader body.

The use of a central body or frame having side walls with a separate plate having drive components supported thereon and then bolted or otherwise secured on the outside surface of the body permits a wide variety of ground drive and support members to be preassembled and then installed on the body. The ground drive and support members essentially are not connected to the body except through the mounting plate.

Although the present invention has been described with reference to preferred embodiments, workers skilled in the art will recognize that changes may be made in form and detail without departing from the spirit and scope of the invention.

What is claimed is:

1. A self-propelled loader comprising a frame having a pair of generally upright side plates, and an engine mounted on the frame, a pair of loader arms mounted at rear portions of the frame and operable to raise and lower forward ends of the loader arms to carry loads, a separate removable drive assembly mounted on each of the upright side plates of the frame, each drive assembly including a support plate mountable to a respective upright side plate of the frame, at least two rotatable wheels on the support plate a flexible endless drive track mounted on the wheels on each respective support plate, each drive assembly further comprising a support housing mounted on the respective support plate, one of the rotatable wheels comprising an idler wheel slidably supported on said support housing to engage the endless drive track, and a plurality of bogie wheels mounted on said support housing on a lower side thereof, the idler wheel and the bogie wheels providing a support for the endless drive track, each of said support plates being removably bolted to a side plate of the frame of the loader, respectively.

2. The loader construction of claim 1, wherein the support housing includes a slide housing, a slide member slidably mounted in the slide housing, the idler wheel mounted on the slide member, and a spring in the slide housing for urging the associated slide member and idler wheel in a direction to create a tension in the endless drive track mounted on the respective support plate.

3. A self-propelled vehicle construction comprising a center body, the body having spaced apart side walls, a drive and support assembly for attachment to one of the spaced apart side walls on the exterior of such side wall, said drive and support assembly including a single mounting plate, a drive wheel and an idler wheel mounted on said mounting plate, the drive wheel and idler wheel being spaced apart, a housing of smaller size than the mounting plate secured to the mounting plate and extending laterally outwardly therefrom, an endless drive member coupling the drive wheel and the idler wheel, and a tensioner mounted on the smaller housing for creating a tension in the endless drive member, the mounting plate having portions extending outwardly from an exterior of the housing, said portions being accessible for attachment to the one side wall of the center body.

* * * * *